United States Patent [19]
Strobl

[11] Patent Number: 5,293,092
[45] Date of Patent: Mar. 8, 1994

[54] ASSEMBLED COMMUTATOR

[75] Inventor: Georg Strobl, Stuttgart, Fed. Rep. of Germany

[73] Assignee: Johnson Electric S.A., Switzerland

[21] Appl. No.: 976,167

[22] Filed: Nov. 12, 1992

[30] Foreign Application Priority Data

Nov. 12, 1991 [GB] United Kingdom ............. 9124017
Apr. 15, 1992 [GB] United Kingdom ............. 9208306

[51] Int. Cl.[5] ............................................. H02K 13/04
[52] U.S. Cl. ..................................... 310/233; 310/236
[58] Field of Search ............. 310/233, 234, 236, 237, 310/71, 40 MM, 42, 68 R, 72

[56] References Cited

U.S. PATENT DOCUMENTS

| 3,487,248 | 12/1969 | Kaneko et al. | 310/220 |
| 4,469,972 | 9/1984 | Rampignon et al. | 310/233 |
| 4,855,632 | 8/1989 | Baines | 310/233 |
| 4,927,379 | 5/1990 | Wang et al. | 439/398 |
| 5,012,149 | 4/1991 | Strobl | 310/234 |
| 5,128,578 | 7/1992 | Strobl | 310/234 |

FOREIGN PATENT DOCUMENTS

| 1266867 | 4/1968 | Fed. Rep. of Germany | 310/233 |
| 1436805 | 3/1966 | France | 310/233 |
| 391888 | 5/1933 | United Kingdom | 310/233 |
| 2060274 | 4/1981 | United Kingdom | 310/233 |
| 2105527 | 3/1983 | United Kingdom | 310/233 |
| 2183933 | 6/1987 | United Kingdom | 310/233 |
| 2191345 | 12/1987 | United Kingdom | 310/233 |
| 2202688 | 2/1988 | United Kingdom | 310/233 |
| 2202686 | 9/1988 | United Kingdom | 310/233 |

OTHER PUBLICATIONS

Vol. 7, No. 255 (E-910) [1400], Nov. 12, 1983, Rotor Structure for Cup-Shaped Coreless Motor, Abstract of Patent No. 58-141660(A).

Primary Examiner—Robert Skudy
Assistant Examiner—Matthew Nguyen
Attorney, Agent, or Firm—Ostrolenk, Faber, Gerb & Soffen

[57] ABSTRACT

An assembled commutator has an insulating commutator body having a cylindrical outer surface, radially extending axial support means and an axial extension on the opposite side of the axial support means to the cylindrical outer surface. Three commutator segments each have an arcuate brush-contacting portion seated on the cylindrical outer surface of the commutator body, an axial terminal stem extending through a passage formed in the axial support means, and a radial terminal stem seated in one of three equiangularly extending radial grooves formed in the axial support means. An apertured insulating clamping member which is press-fitted on a first part of the axial extension clamps an apertured varistor which is seated on a second part of the axial extension in electrically conductive engagement with the radial terminal stems.

21 Claims, 1 Drawing Sheet

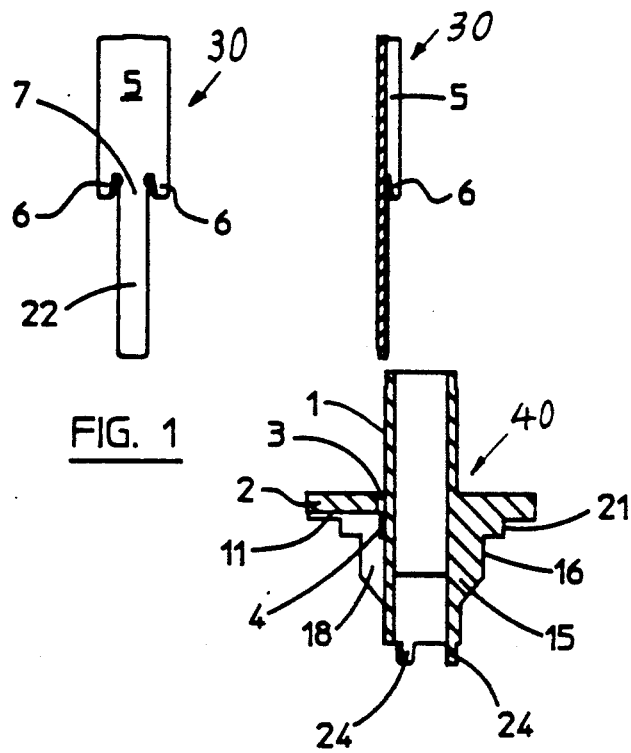
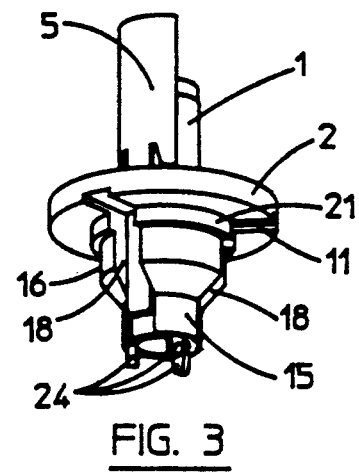
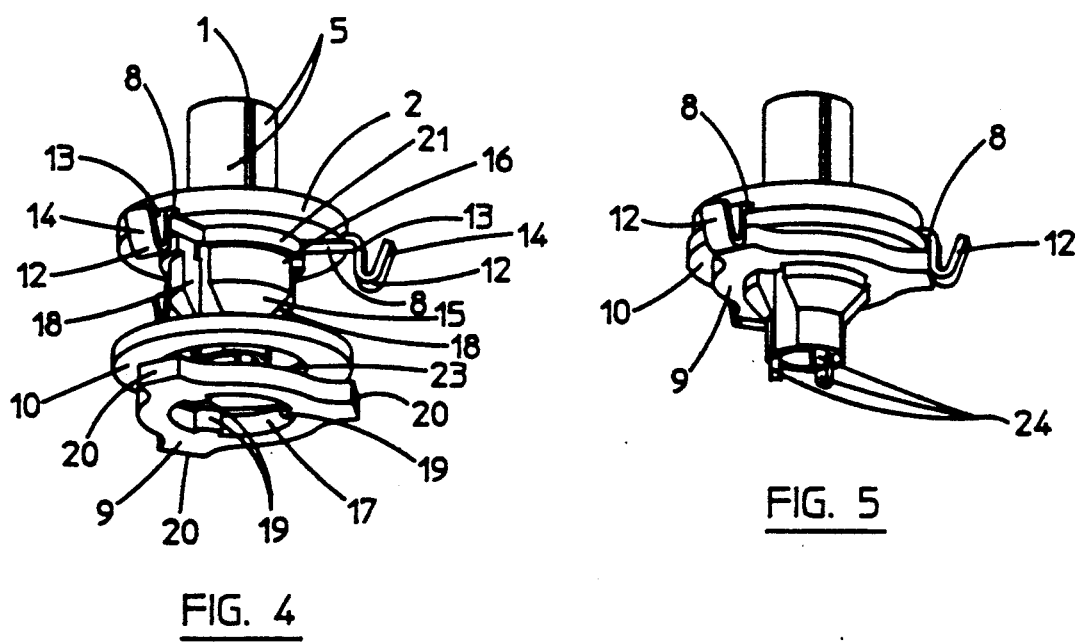

ASSEMBLED COMMUTATOR

FIELD OF THE INVENTION

The invention relates to an assembled commutator in which the commutator segments and, possibly, an electromagnetic interference suppressor element such as a varistor, are formed separately and subsequently fitted together.

BACKGROUND ART

One way to fasten the metallic commutator segments to the insulating body of the commutator is to provide these segments as inserts in a molded plastic commutator body. However, this molding process requires precise and time-consuming positioning of the commutator segments and the resultant molder commutators have to be individually hand finished to remove the inevitable unwanted excessive pieces of plastic material.

To avoid this difficulty, the commutator body and the commutator segments are formed separately so as to cooperate with each other and are subsequently assembled in a manner which ensures that the segments are securely fastened to the commutator body.

Thus, as disclosed in the specification of UK Patent No. 2 105 527, it is known to provide a commutator comprising an insulating commutator body having a cylindrical outer surface and integral, radially extending axial support means formed with axially extending openings; at least three commutator segments mounted on the body, each having an arcuate brush contacting portion seated on the cylindrical outer surface of the body, radial positioning means extending axially from one end of the brush contacting portion into one of said axially extending openings, and a radial terminal stem; and an insulating clamping member for clamping the radial terminal stems between the axial support means and the insulating clamping member.

In this known construction, the radial terminal stem of each commutator segment extends radially from one end of the arcuate portion of the segment forming the brush contacting portion and the radial positioning means consist of two axial projections on opposite sides of the radial terminal stem. The clamping member is an annular ring which is press-fitted over the brush contacting portions of the commutator segments so as to clamp the radial stem portions against the axial support means. As a result, difficulty is encountered in fitting the clamping member. The two radial positioning means are also of limited effectiveness in that the proportion of the circumferential width of each segment available for use in the radial positioning means is limited because the central part, between the radial positioning means, is used to form the radial terminal stems. Moreover, when the segments are secured in position by the clamping member, the radial loading on the segments is provided solely, or almost solely, by the clamping member.

BRIEF DESCRIPTION OF INVENTION

The purpose of the present invention is to provide an assembled commutator in which the components can be more easily and effectively assembled.

This is achieved by constructing the commutator so that each axially extending opening has a passage which extends right through the axial support means; the radial positioning means comprise axial terminal stems disposed respectively within the passages; and the radial terminal stems extend respectively from the axial terminal stems on the opposite side of the axial support means to the brush contacting portions of the commutator segments.

Thus, according to the invention, each axially extending opening has a passage which extends right through the axial support means; the radial positioning means comprise axial terminal stems disposed respectively within the passages; and the radial terminal stems extend respectively from the axial terminal stems on the opposite side of the axial support means to the brush contacting portions of the commutator segments.

Each commutator segment is formed initially with a strip extending from one end of its brush contacting portion. During assembly, this strip is passed through one of the passages in the axial support means and the free end of the strip is bent radially outwards so that the axially extending and radially extending portions of the strip form axial and radial terminal stems.

This form of construction makes it easier to provide, as part of the commutator, an electromagnetic suppressor element such as a varistor which may be clamped in contact with the radial terminal stems between the axial support means and the clamping member.

Where the suppressor element is an annular ring, it may be mounted around the axial terminal stems, between the axial support means and the radial terminal stems. However, in this case, because suppressor elements such as varistors are sometimes made of relatively brittle and/or friable sintered material which could be damaged while bending the commutator segment strips to form the radial terminal stems, the electromagnetic interference suppressor element is preferably mounted between the radial terminal stems and the clamping member.

The axial support means therefore may be provided with radial grooves extending from the axially extending passages for accommodating the radial terminal stems. Each such groove must be shallower than the thickness of the radial terminal stem accommodated in said groove so that the radial terminal stem stands axially clear of the axial support means and is able to contact the adjacent clamping member or suppressor element.

In order to connect armature leads to the commutator segments, a "U"-shaped configuration may be formed at the outer extremity of each radial terminal stem, with an inner axially extending arm which rests on the clamping member and an outer arm joined to the inner arm so that each armature lead can be clamped between the inner and outer arms of the "U"-shaped configuration. Where this clamping operation is performed with the application of heat, to effect welding between the inner and outer arms, the clamping member may be made of a heat and pressure resistant material, such as glass fibre impregnated epoxy resin, capable of withstanding the pressures and temperatures encountered in the hot staking process adopted to effect the welding.

The commutator body may be provided with an extension on the opposite side of the axial support means to the cylindrical outer surface to simplify mounting of the clamping member and, if used, the suppressor element. The axial extension may be provided with a first part for seating the clamping member and the clamping member may be provided with an aperture which receives the first part of the axial extension. In this case, the axial extension is preferably circular in cross-section. This simplifies construction and assembly of the components of the commutator.

Where the diameter of the first part of the axial extension is larger than the diameter of the cylindrical outer surface of the commutator body, the first part may be formed with axially extending grooves aligned with the passages for receiving the strips extending from the brush contacting portions of the commutator segments when these strips are passed through the passages formed in the axial support means.

In this case, where a "U"-shaped configuration is formed at the outer extremity of each radial terminal stem and the inner axially extending arms of these configurations rest on circumferentially spaced portions of the clamping member, the clamping member may be provided with at least one inwardly projecting portion seated in one of said axially extending grooves. This ensures that the circumferentially spaced portions are angularly aligned with the "U"-shaped configurations.

Where the commutator is provided with a suppressor element the axial extension may be provided with a second part, having a greater diameter than the first part, for seating the suppressor element. As in the case where the first part of the axial extension, where the diameter of the second part of the axial extension is larger than the diameter of the outer surf ace of the commutator body, the second part may be formed with axially extending slots aligned with the passages to enable the commutator segments to be mounted on the commutator body.

Although separate fastening means may be provided for holding the clamping member in place, the clamping member is preferably press-fitted on the first part of the axial extension.

An assembled commutator according to the invention and incorporating various optional features is hereinafter described, by way of example, with reference to the accompanying drawings.

BRIEF DESCRIPTION OF THE DRAWINGS

FIG. 1 is an elevational view of one of three commutator segments of an assembled commutator according to the invention;

FIG. 2 is an exploded sectional side elevation of an insulating commutator body and a segment as shown in FIG. 1;

FIG. 3 is a perspective view of the commutator body and the segment of FIG. 2, showing the parts at a later stage of assembly; and FIGS. 4 and 5 are exploded and assembled perspective views of an assembled commutator according to the invention, incorporating an electromagnetic interference suppressor element.

BEST MODES FOR CARRYING-OUT THE INVENTION

The commutator segment 30 shown in FIGS. 1 and 2 comprises an arcuate brush contacting portion 5 and, extending from one end of the brush contacting portion 5, two radial positioning members 6 and an integral strip 22 having, at its inner end, between the members 6 an axial terminal stem 7 which serves as an additional radial positioning member.

As shown in FIG. 2, the commutator body 40 has a cylindrical outer surface 1, an annular radially extending axial support 2 and a circular-section axial extension 15 on the opposite side of the axial support 2 to the cylindrical outer surface 1. Three equiangularly-spaced axially extending openings comprising passages 3 for the strips 22 and laterally disposed blind recesses 4 for the two radial positioning members 6 are formed in the axial support 2 and axially extending grooves 18, respectively formed in the axial extension 15, are aligned with the passages 3.

The axial extension 15 has first and second parts 16 and 21 engaging apertures 23 and 17 respectively formed in an insulating clamping member 9 of glass fiber impregnated epoxy resin and a varistor 10, as shown in FIGS. 4 and 5, and three axial projections 24 for attachment to the armature portion of the rotor of an electric motor.

Each commutator segment 30 is mounted on the commutator body 40 by passing the strip 22 through one of the passages 3 and into the aligned axially extending groove 18, as shown in FIG. 3. The segment is then secured to the commutator body by moving the segment axially until the radial positioning members 6 are seated in the blind recesses 4 on opposite sides of the passage 3 and bending the free end of the strip 22 radially outwards so that it seats in one of three radial grooves 11 formed in the axial support 2. The outer extremity of the strip 22 is bent to form a "U"-shaped configuration 12 which has an inner axially extending arm 13 and an outer arm 14, for clamping an armature lead. Each strip 22 thus provides an axial terminal stem 7, adjacent the brush contacting portion 5 of the commutator segment 30, which serves as an additional radial positioning member, a radial terminal stem 8, and a "U"-shaped configuration 12.

In this construction, the grooves 11 are shallower than the thickness of the radial terminal stems 8 and the varistor 10 projects axially beyond the second part 21 of the axial extension 15 so that the varistor 10 is held in contact with the radial terminal stems 8 by the clamping member 9 which is press-fitted to the first part 16 of the axial extension 15.

As shown, the aperture 17 in the clamping member 9 has three inwardly projecting portions 19 respectively seated in the grooves 18 and the clamping member 9 has three circumferentially spaced outer surfaces 20 arranged respectively as radial supports for the inner arms 13 of the "U"-shaped configurations 12 at the ends of the radial terminal stems 8. Armature leads (not shown) can therefore be attached to each commutator segment 30 by being placed between the inner and outer arms 13 and 14 of a "U"-shaped configuration 12 and then clamping the two arms 13 and 14 in a hot staking operation in which heat and pressure cause the two arms 13 and 14 to be welded together.

What is claimed is:

1. An assembled commutator comprising:
   an insulating commutator body having a cylindrical outer surface, an integral, radially extending axial support means formed with axially extending openings each having a passage which extends through the axial support means, the axial support means having first and second sides, the first side adjacent the cylindrical outer surface, the second side being opposite the first side, and further comprising an axial extension on the second side of the axial support means;
   at least three commutator segments mounted on the body, each having an arcuate brush contacting portion seated on the cylindrical outer surface of the body, and further having radial positioning means, comprising an axial terminal stem portion extending axially from one end of the brush contacting portion into one of the axially extending openings so that the axial terminal stem portions are disposed within respective ones of the passages and the commutator segments are held securely in position on the commutator body, and further having a radial terminal stem portion disposed at approximately a right angle to the axial terminal stem portion extending respectively from the axial terminal stem portion on the second side of the axial support means;

an electromagnetic interference suppressor element having a first aperture therein through which first aperture the axial extension extends and said element being in electrical contact with the radial terminal stem portions; and an insulating clamping member having a second aperture therein through which second aperture the axial extension extends, for clamping the radial terminal stem portions and the suppressor element together between the axial support means and the insulating clamping member.

2. A commutator, according to claim 1, in which an electromagnetic interference suppressor element is mounted between the radial terminal stem portions and the clamping member.

3. A commutator, according to claim 2, in which:
the axial support means are provided with radial grooves extending from the passages for accommodating the radial terminal stem portions; and
each groove is shallower than the thickness of the radial terminal stem portions accommodated in said groove so that the radial terminal stem portions stands axially clear of the axial support means.

4. A commutator, according to claim 1, in which a "U"-shaped configuration is formed at the outer extremity of each radial terminal stem portion and has an inner axially extending arm which rests on the clamping member and an outer arm joined to the inner arm.

5. A commutator, according to claim 4, in which the clamping member is made of a heat and pressure resistant material.

6. A commutator, according to claim 1, in which:
the axial extension has a first part for seating the clamping member and a second part, having a larger cross-section than the first part, for seating the suppressor element.

7. A commutator, according to claim 6, in which the cross-section of the first part of the axial extension is larger than the cross-section of the cylindrical outer surface of the commutator body and the first and second parts are formed with axially extending grooves aligned with the passages.

8. A commutator, according to claim 7, in which:
the clamping member has at least one inwardly projecting portion seated in one of said axially extending grooves and a plurality of circumferentially spaced portions which are angularly aligned with the radial terminal stem portions; and
a "U"-shaped configuration is formed at the outer extremity of each radial terminal stem portion and has an inner axially extending arm, resting on one of the circumferentially spaced portions of the clamping member, and an outer arm joined to the inner arm.

9. A commutator, according to claim 8, in which the clamping member is made of a heat and pressure resistant material.

10. A commutator, according to claim 6, in which the clamping member is press-fitted on the first part of the axial extension.

11. An assembled commutator comprising:
an insulating commutator body having a cylindrical outer surface, an integral, radially extending, axial support means with three axially extending openings, each having a passage which extends through the axial support means, the axial support means having first and second sides, the first side adjacent the cylindrical outer surface, the second side being opposite the first side, radial grooves extending from the passages and being disposed on the second side of the axial support means, and further comprising an axial extension formed on said second side of the axial support means, the axial extension having a first part, having a cross-section greater than the cylindrical outer surface, a second part, located adjacent the axial support means and having a cross-section greater than the first part, and axially extending grooves aligned with the passages and formed in both the first and second parts of the axial extension;

three commutator segments mounted on the body, each segment having an arcuate brush contacting portion seated on the cylindrical outer surface of the body, radial positioning means extending axially from one end of the brush contacting portion into one of the axially extending openings with an axial terminal stem portion disposed within the passage forming part of said one of the axially extending openings, and a radial terminal stem portion which extends radially from the axial terminal stem portion along with radial groove extending from said passage, the radial terminal stem portion being thicker than the depth of the radial groove so as to stand axially clear of the axial support means and further having an outer extremity formed as a "U"-shaped configuration with an inner axially extending arm and an outer arm;

an insulating clamping member of heat and pressure resistant material press-fitted on the first part of the axial extension, the clamping member having three inwardly projecting portions respectively located within the axially extending grooves and three circumferentially spaced portions which are angularly aligned, respectively, with the radial terminal stems to bear against and support respective inner arms of the "U"-shaped configurations; and an electromagnetic interferences suppressor element mounted between the radial terminal stem portions and the clamping member and seated on the second part of the axial extension, said clamping member holding said suppressor element securely in position between said radial terminal stem portions on said axial support means and said clamping member.

12. An assembled commutator comprising:
an insulating commutator body having a cylindrical outer surface, an integral, radially extending axial support means formed with axially extending openings each having a passage which extends through the axial support means, the axial support means having first and second sides, the first side adjacent the cylindrical outer surface, the second side being opposite the first side, and further comprising an axial extension on the second side of the axial support means;

at least three commutator segments mounted on the commutator body, each having an arcuate brush contacting portion seated on the cylindrical outer surface of the body, and further having radial positioning means, comprising an axial terminal stem portion extending axially from one end of the brush contacting portion into one of the axially extending openings and for holding the respective commutator segment in radial abutment with the cylindrical outer surface of the commutator body such that said axial terminal stem portions are disposed within respective ones of the passages, and a radial terminal stem portion formed at approximately a right angle to the axial terminal stem portion extending respectively from the axial terminal stem portion on the second side of the axial support means;

an electromagnetic interference suppressor element having a first aperture therein through which first aperture the axial extension extends, and said element being in electrical contact with the radial terminal stem portions whereby when said radial stem portions are heated to make connection of electrical conductors thereto, electrical connection between said suppressor element and said radial stem portions is facilitated; and an insulating clamping member having a second aperture therein through which second aperture the axial extension extends for clamping the radial terminal stem portions and the suppressor element together between the axial support means and the insulating clamping member.

13. A commutator, according to claim 12, in which the suppressor element is mounted between the radial terminal stem portions and the clamping member.

14. A commutator, according to claim 13, in which:
the axial support means are provided with radial grooves extending from the passages for accommodating the radial terminal stem portions; and
each radial groove is shallower than the thickness of the radial terminal stem portion accommodated in said groove so that the radial terminal stem portion stands axially clear of the axial support means.

15. A commutator, according to claim 12, in which a "U"-shaped configuration is formed at the counter extremity of each radial terminal stem portion and has an inner axially extending arm which resets on the clamping member and an outer arm joined to the inner arm.

16. A commutator, according to claim 15, in which the clamping member is made of a heat and pressure resistant material.

17. A commutator, according to claim 12, in which:
the axial extension has a first part for seating the clamping member and a second part, having a greater cross-section than the first part, for seating the suppressor element.

18. A commutator, according to claim 17, in which the cross-section of the first part of the axial extension is larger than the cross-section of the cylindrical outer surface of the commutator body and the first and second parts are formed with axially extending grooves aligned with the passages.

19. A commutator, according to claim 18, in which:
the clamping member has at least one inwardly projecting portion seated in one of said axially extending grooves and a plurality of circumferentially spaced portions which are angularly aligned with the radial terminal stem portion and has an inner axially extending arm, resting on one of the circumferentially spaced portions of the clamping member, and an outer arm joined to the inner arm.

20. A commutator, according to claim 19, in which the clamping member is made of a heat and pressure resistant material.

21. A commutator, according to claim 17, in which the clamping member is press-fitted on the first part of the axial extension.

* * * * *